United States Patent
Tredoux et al.

(10) Patent No.: US 9,609,515 B2
(45) Date of Patent: Mar. 28, 2017

(54) SYSTEM AND METHOD FOR VERIFYING PHYSICAL PROXIMITY TO A NETWORK DEVICE

(71) Applicant: XEROX CORPORATION, Norwalk, CT (US)

(72) Inventors: Gavan L. Tredoux, Penfield, NY (US); Peter J. Zehler, Penfield, NY (US); Premkumar Rajendran, Webster, NY (US); Roger T. Kramer, Rochester, NY (US)

(73) Assignee: XEROX CORPORATION, Norwalk, CT (US)

( * ) Notice: Subject to any disclaimer, the term of this patent is extended or adjusted under 35 U.S.C. 154(b) by 269 days.

(21) Appl. No.: 13/851,264

(22) Filed: Mar. 27, 2013

(65) Prior Publication Data

US 2014/0292496 A1    Oct. 2, 2014

(51) Int. Cl.
*H04Q 5/22* (2006.01)
*H04W 12/08* (2009.01)
*H04L 29/06* (2006.01)
*H04W 4/00* (2009.01)
*G06F 21/35* (2013.01)
*G06F 21/60* (2013.01)
*G06F 21/79* (2013.01)

(52) U.S. Cl.
CPC .......... *H04W 12/08* (2013.01); *G06F 21/35* (2013.01); *G06F 21/606* (2013.01); *G06F 21/608* (2013.01); *G06F 21/79* (2013.01); *H04L 63/0492* (2013.01); *H04W 4/008* (2013.01); *G06F 2221/2111* (2013.01); *G06F 2221/2115* (2013.01)

(58) Field of Classification Search
CPC combination set(s) only.
See application file for complete search history.

(56) References Cited

U.S. PATENT DOCUMENTS

| | | | |
|---|---|---|---|
| 2006/0116899 A1* | 6/2006 | Lax et al. | 705/1 |
| 2009/0201136 A1* | 8/2009 | Itagaki | 340/10.52 |
| 2013/0145420 A1* | 6/2013 | Ting et al. | 726/1 |
| 2013/0303085 A1* | 11/2013 | Boucher et al. | 455/41.1 |

\* cited by examiner

*Primary Examiner* — Brian Zimmerman
*Assistant Examiner* — Cal Eustaquio
(74) *Attorney, Agent, or Firm* — MH2 Technology Law Group LLP

(57) ABSTRACT

Systems and methods for verifying physical proximity to a network device are provided. The method includes acquiring a tag identifier from a tag fixed in, on, or proximal to a network device, using a computing device. The tag is configured to be read and written to by electronic communication with the computing device, when the computing device is disposed in proximity to the tag. The method further includes transmitting data indicative of the tag identifier to a server, and receiving an authorization confirmation from the server. The method also includes rewriting the tag so as to replace the tag identifier with a new tag identifier, using the computing device, and performing one or more operations with the network device after receiving the authorization.

19 Claims, 4 Drawing Sheets

SYSTEM AND METHOD FOR VERIFYING PHYSICAL PROXIMITY TO A NETWORK DEVICE

TECHNICAL FIELD

The present disclosure relates generally to systems and methods for determining physical proximity to a device including, without limitation, a printing device.

BACKGROUND

Many different types of devices may be remotely accessible over a network, regardless of physical proximity; however, it may be useful to detect or otherwise ensure physical proximity of a user to the device being accessed. One example of such an application is in a printing device. Detecting physical proximity can be combined with traditional physical access controls (locks, area monitoring, etc.). Thus, for example, a user standing in front of a multi-function device (MFD) may be allowed to scan from the MFD to a mobile device over a network connection, but users who are remotely located may not be permitted to do so. Moreover, some printer functions may require a print job to be released, with the intent being to provide the document to the user upon demand when the user is physically proximal to the printer.

However, such physical proximity detection systems are prone to defeat by a user causing the system to erroneously believe that the user is in physical proximity to the device. For example, if the proof of proximity is static, it may be replayed or reused after an initial access by a physically proximal user. One way this is avoided is by displaying a dynamic access code, which a user must enter on a device to ensure proximity. Another way is to display a two-dimensional glyph or other image, which may be captured by a camera of the remote device. In either case, the captured code/glyph may be forwarded to the server, which responds by determining that the code/glyph is correct and then authorizing the mobile device.

Generally, such codes are displayed on a screen associated with the device; however, some devices lack a screen capable of displaying such codes and, moreover, may not prevent a physically proximal user from relaying the code to a remote user. Furthermore, using a camera of a mobile device may be inconvenient and cumbersome to adequately capture the code, and may require mobile devices with sufficient capabilities to perform, display, and transmit such glyphs or two-dimensional codes. Moreover, some locations may completely prohibit use of cameras, videos, etc., rendering this physical proximity detection technique unusable.

SUMMARY

Embodiments of the disclosure may provide a method for verifying physical proximity to a network device. The method includes acquiring a tag identifier from a tag fixed in, on, or proximal to a network device, using a computing device. The tag is configured to be read and written to by electronic communication with the computing device, when the computing device is disposed in physical proximity to the tag. The method further includes transmitting data indicative of the tag identifier to a server, and receiving an authorization confirmation from the server. The method also includes rewriting the tag so as to replace the tag identifier with a new tag identifier, using the computing device, and performing one or more operations with the network device after receiving the authorization.

Embodiments of the disclosure may also provide a method for verifying physical proximity to a network device. The method includes associating a network device with a tag identifier of a tag fixed to, in, or proximal to the network device. The tag is readable and writable using electronic communication with a computing device located in physical proximity to the tag. The method also includes receiving an authorization request from the computing device, the authorization request including data indicative of an acquired tag identifier, and determining that the acquired tag identifier matches the tag identifier associated with the network device. The method further includes, in response to determining that the acquired tag identifier matches the tag identifier, causing the computing device to rewrite the tag so as to substitute the tag identifier with a new tag identifier.

Embodiments of the disclosure may further provide a system. The system includes a network device, and a tag that is readable and writeable by electronic communication with a computing device positioned in physical proximity to the tag, the tag being fixed in a location in, on, or proximal to the network device and being configured to store a tag identifier. The system also includes a server coupled to the network device. The server includes one or more processors and one or more computer-readable storing instructions that, when executed by at least one of the one or more processors, are configured to cause the server to perform operations. The operations include associating the network device with the tag identifier, and receiving an authorization request from the computing device. The authorization request includes data indicative of an acquired tag identifier. The operations further include determining that the acquired tag identifier matches the tag identifier of the network device, and, in response to determining that the acquired tag identifier matches the tag identifier, causing the computing device to rewrite the tag so as to substitute the tag identifier with a new tag identifier.

BRIEF DESCRIPTION OF THE DRAWINGS

The accompanying drawing, which is incorporated in and constitutes a part of this specification, illustrates an embodiment of the present teachings and together with the description, serves to explain the principles of the present teachings.

Figure 1:
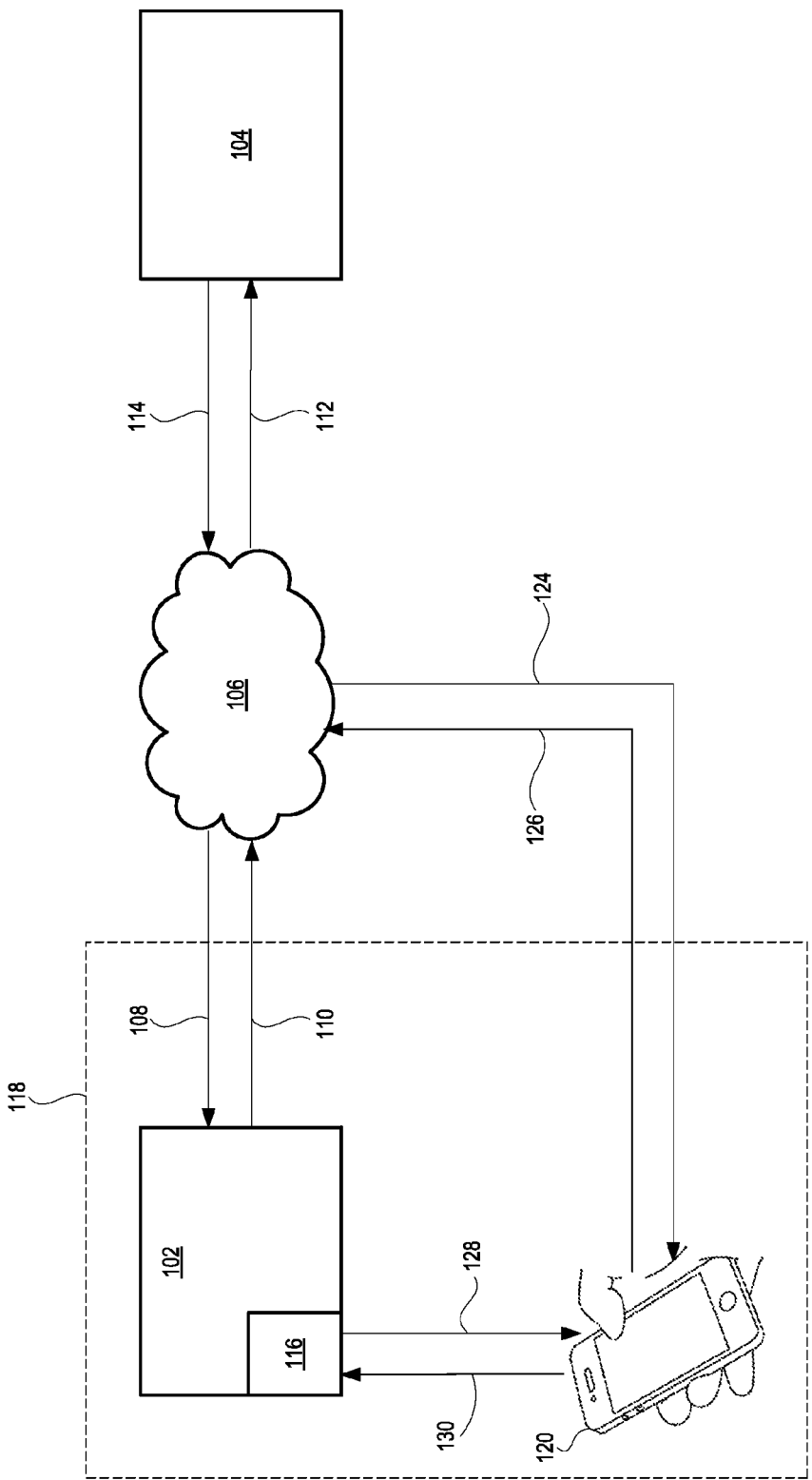
FIG. 1 illustrates a schematic view of a network system, according to an embodiment.

It should be noted that some details of the figure have been simplified and are drawn to facilitate understanding of the embodiments rather than to maintain strict structural accuracy, detail, and scale.

DETAILED DESCRIPTION

Reference will now be made in detail to embodiments of the present teachings, examples of which are illustrated in the accompanying drawing. In the drawings, like reference numerals have been used throughout to designate identical elements. In the following description, reference is made to the accompanying drawing that forms a part thereof, and in which is shown by way of illustration a specific exemplary embodiment in which the present teachings may be practiced. The following description is, therefore, merely exemplary.

FIG. 1 illustrates a network system 100, according to an embodiment. The network system 100 (hereinafter, "system 100") generally includes a network device 102, a server 104, and a network 106 linking the network device 102 to the server 104, thereby allowing data transmission therebetween. In an embodiment, the network device 102 may be a printing device, such as a multi-function device (MFD), as are known in the art. In other embodiments, the network device 102 may be any other type of computing device that may be connected to the network 106, such as a computer terminal, kiosk, or any other like device. The server 104 may be representative of one or more processors, memory storage units, etc. configured to provide one or more computing systems, which may be arranged in any suitable configuration. Additionally, in at least one embodiment, the network device 102 may provide the server 104 or one or more functions thereof, as discussed below, which may potentially obviate a need for the network 106 in this regard.

Further, the network 106 may be any suitable type of network, for example, including wireless data transfer. Examples of such networks may include wireless Ethernet, Global System for Mobile Communications (GSM), Enhanced Data rates for GSM Evolution (EDGE), Universal Mobile Telecommunications System (UMTS), Worldwide Interoperability for Microwave Access (WiMAX), Long Term Evolution (LTE), etc. Further, the network 106 may include a wired communications network using any suitable transmission protocol, structure, type of wire/fiber, etc.

The network device 102 may be configured to transmit data to the network 106 via connection line 108 and receive data therefrom via connection line 110. Similarly, the server 104 may be configured to transmit data to the network 106 via connection line 112 and to receive data therefrom via connection line 114.

The system 100 may also include a tag 116, which may be fixed on, in, or proximal to (e.g., within a line of sight) to the network device 102. For example, the tag 116 may be mounted to a wall next to the network device 102 and secured thereto using an enclosure constructed from a suitably rugged material that may avoid substantial interference with electrical, optical, sound, or other types of communication, as will be appreciated from the details of the functioning of the tag 116 provided below. In some embodiments, the tag 116 may be disposed within a casing of the network device 102, glued, fastened, or otherwise secured directly to the network device 102 and/or disposed internally thereto.

The tag 116 may be any suitable device capable of active or passive short range communication. Further, the tag 116 may be capable of being "read," e.g., either actively or passively providing a digital identifier, referred to herein as a "tag identifier" to a device equipped with appropriate reading hardware. Further, the tag 116 may be capable of being "rewritten" such that the tag identifier is changed. Such rewriting may include deleting and replacing an old tag identifier, overwriting an old tag identifier, or any other process of changing the tag identifier. Furthermore, "rewriting" does not necessarily requiring a complete substitution of information stored in the tag 116, but may result in a partial substitution thereof. In some cases, the tag identifier may be encrypted, such that the tag 116 may be read and/or rewritten without the device that is reading/rewriting having access to the unencrypted tag identifier. In a specific example, the tag 116 may be a near field communication (NFC) tag, such as an unpowered, rewritable radio-frequency identification (RFID) tag, or any other suitable device. Such NFC tags may require close proximity for effective reading, for example, within about 10 meters, about 5 meters, about 1 meter, about 50 centimeters, about 10 centimeters, about 1 centimeter, or the like.

Accordingly, the network device 102 and the tag 116 may be located in an area 118. The area 118 may be representative of any or a portion of any area of physical proximity to the network device 102. For example, the area 118 may represent part of a printing area or room in a building, but other areas may be employed without departing from the scope of the present disclosure. The server 104 may located in or, as shown, outside of the area 118. The area 118 may be defined, for example, according to the effective range of communication with the tag 116, described above. The area 118 may be generally circular in some cases, may be affected by structures that interrupt or interfere with wireless electrical communication and/or the like. Accordingly, as it relates to the tag 116, "physical proximity" may refer to the effective range of the tag 116 for communication, i.e., the size of the area 118. Furthermore, in some instances, the size of the area 118 may be configurable, e.g., by selecting a particular tag 116 with a desired effective range or otherwise altering or configuring the effective range of a single tag 116.

A computing device 120 may communicate with the network device 102, the tag 116, and/or the server 104, for example, when brought into the area 118. A "computing device" may be any combination of hardware and software, capable of supporting the functionalities and data processing/transmitting techniques discussed herein, at least. Further, such computing device 120 may be commercially-available operable for a host of other functions, or may be a special-purpose device tailored for use in the system 100. In at least one embodiment, the computing device 120 may be a mobile device, as shown. As used herein, the term "mobile device" may refer to any type of mobile or stand-alone device. For example, the computing device 120 may be provided by one or more of a mobile phone, a tablet device, a notebook device, a personal data assistant (PDA), or the like.

In an embodiment, the computing device 120 may connect to the network 106 to effect such communication with the server 104 and/or the network device 102; accordingly, the computing device 120 may transmit data to the network 106 via a data connection 122 and receive data therefrom via a data connection 124. For example, the data connections 124, 126 may represent a wireless connection, a USB connection, an Ethernet connection, and/or the like. Furthermore, the network 106 may represent two or more linked networks, e.g., a network provided by a commercial data provider (e.g., a cellular provider), from which communications are routed to the server 104 on a local network. Through the connection 124, 126 with the network 106, the computing device 120 may be able to receive data from the network device 102. In another embodiment, the computing device 120 may be directly connected to the network device 102, for example, via a USB connection, Ethernet, Bluetooth, or another type of connection.

The computing device 120 may receive images of scanned documents, print job status, transaction information, or any other data from the network device 102. Moreover, the computing device 120 may be configured to transmit instructions to the network device 102, such as commanding the network device 102 to perform operations, e.g., printing, scanning, copying, emailing, faxing, document editing, transacting, other processing actions, and/or the like.

The computing device 120 may also be configured to communicate with the tag 116. As shown, the computing device 120 may be configured to read information from the tag 116, as depicted by communication line 128, and to write information to the tag 116, as depicted by communication line 130. For example, the computing device 120 may include a radio-frequency initiator, which may energize the tag 116 and allow communication therewith. In one example, the computing device 120 may be configured to acquire a tag identifier by reading the tag 116. Further, reading the tag 116 may provide connection information to establish ("bootstrap") a faster, direct data transmission link between the computing device 120 and the network device 102 (e.g., initiating a Bluetooth pairing). Further, the computing device 120 may be configured to rewrite the tag 116, so as to, for example, change the tag identifier.

Figure 2:
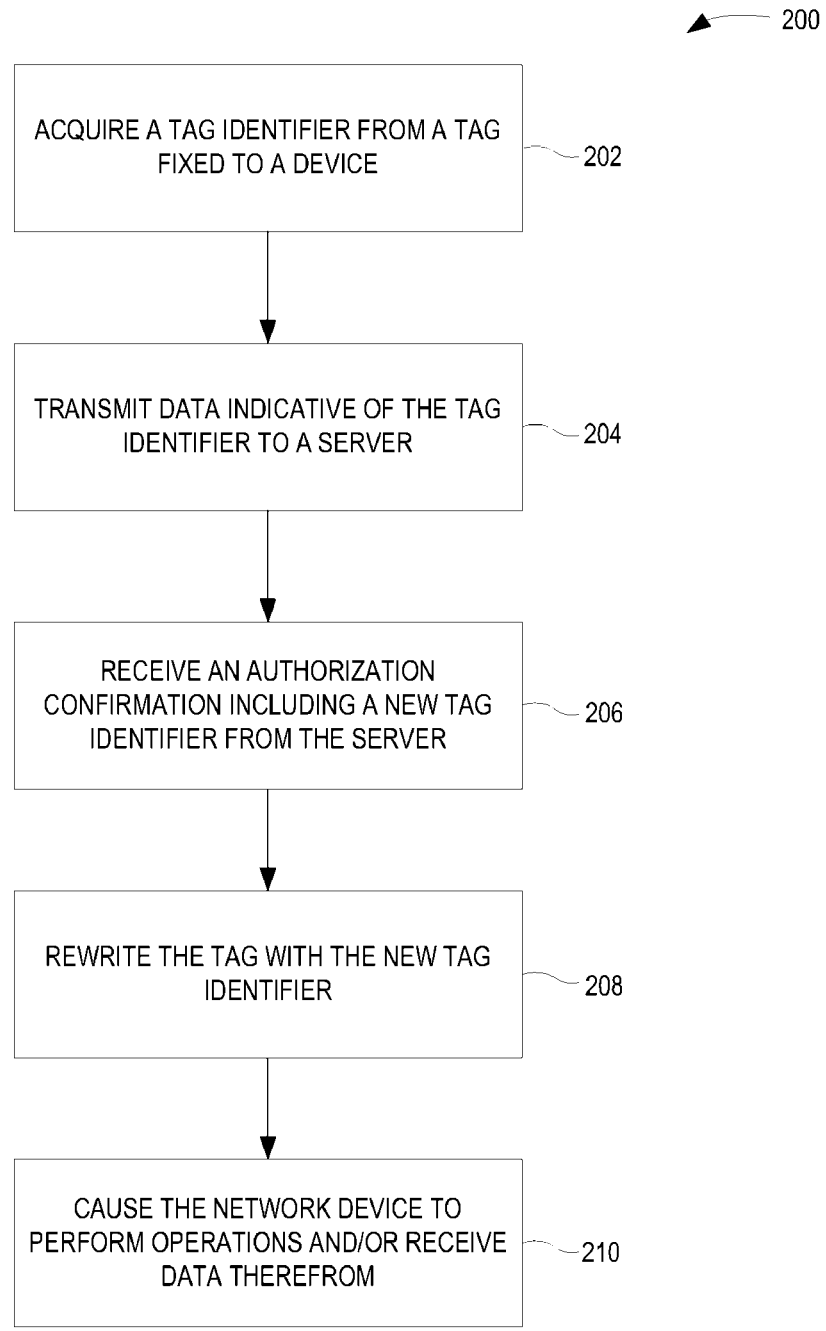
FIG. 2 illustrates a flowchart of a method for verifying physical proximity, according to an embodiment.

FIG. 2 illustrates a method 200 for verifying physical proximity, e.g., of the computing device 120 to the network device 102, according to an embodiment. In at least one embodiment, the method 200 may be carried out by the computing device 120 executing specialized software loaded onto the computing device 120, commonly referred to as an "app" (application). In another embodiment, the computing device 120 may allow a user to manually enter commands to carry out the method 200.

The method 200 may include the computing device 120 reading the tag 116, for example, at least acquiring a tag identifier from the tag 116, as at 202. The tag 116, as noted above, may be fixed on, in, or proximal to the network device 102. To acquire the tag identifier at 202, the computing device 120 may be brought into the area 118, and an RF initiator activated to excite the tag 116 and begin communication therewith.

The tag 116 may then transmit the tag identifier to the computing device 120. In some cases, the tag identifier may be encrypted, such that the computing device 120 does not have access to the unencrypted tag identifier. In other cases, the tag identifier may be unencrypted, or decodable by the computing device 120.

Further, the computing device 120 may acquire other information from the tag 116. For example, the tag 116 may contain a unique identifier of the network device 102 (e.g., serial number, network address, an arbitrarily assigned number, etc.). The tag 116 may also or instead include instructions for establishing direct communication with the network device 102, instructions for sending an authorization request (e.g., including the network address of the server 104), and/or the like.

Upon receipt of the tag identifier, the computing device 120 may proceed to transmitting data indicative of the tag identifier to the server 104, as at 204, for example, by communication therewith through the network 106. The computing device 120 may also transmit information identifying the computing device 120 and/or information associated with a particular user thereof. As such, the transmission may indicate to the server 104 the identity of the user associated with the computing device 120, for example, to indicate a level of authorization delegated to the user.

The computing device 120 may then wait, as the server 104 determines whether the tag identifier is correct and then provides the appropriate authorization or unlock command to the network device 102. In an embodiment, upon authorization, the computing device 120 may receive an authorization confirmation including a new tag identifier from the server 104, as at 206. The new tag identifier may be encrypted, non-encrypted, or encrypted and decodable by the computing device 120. Further, the authorization confirmation may be received directly from the server 104 via the network 106, but in other embodiments, the server 104 may communicate the authorization to the network device 102, which may then communicate the authorization confirmation to the computing device 120. In some embodiments, however, the computing device 120 may instead select the new tag identifier, and transmit the new tag identifier to the server 104.

The method 200 may then proceed to the computing device 120 rewriting the tag 116 with the new tag identifier, as at 208. Before or after such rewriting, the network device 102 may be unlocked and/or readied for use by the user of the computing device 120 or any other user. One, some, or all of the functions of the network device 102, the components thereof, and/or the computing device 120 may be unlocked by the network device 102, the server 104, and/or the computing device 120, in response to the computing device 120 transmitting the correct tag identification.

Accordingly, with the proper authorization received and functions unlocked, the user may cause the network device 102 to perform operations and/or may receive data from the network device 102, as at 210. In some embodiments, the computing device 120 may be used to send commands to the network device 102 and receive information thereof. In other embodiments, the commands may be entered by a user, for example, using buttons, a keyboard, a touchscreen display, etc. of the network device 102. In at least one specific embodiment, the user may cause the network device 102 to scan a document, either using the computing device 120 to send a command or by inputting the command directly into the network device 102, or another device, with the data resulting from the scanned document being transmitted to the computing device 120 or to another location, e.g. another location on the network 106. In another embodiment, the user may cause the network device 102 to release a print job, such that the print job, previously sent from, for example, a workstation in another area of a facility (e.g., office), may then be printed while the user is in proximity to the network device 102.

Accordingly, it will be seen that authorization, commands, and data may be transferred, with it assured that the user of the computing device 120 is in close proximity to the tag 116, which has a limited range to the area 118. Furthermore, the network device 102, in various embodiments, may not need to be equipped with hardware configured to enable communication (e.g., writing, rewriting) the tag 116, as such reading and rewriting may be performed by the computing device 120.

Figure 3:
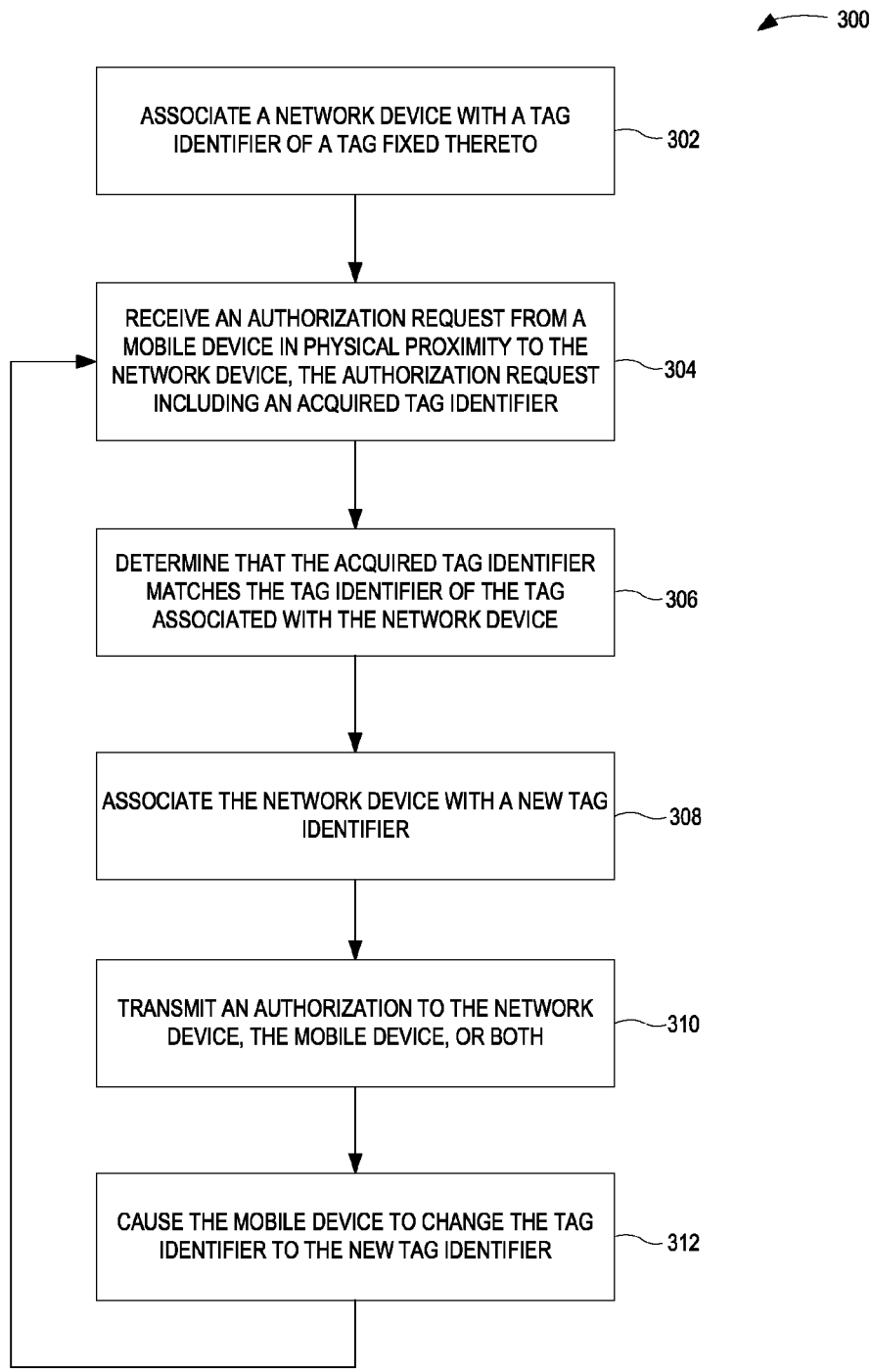
FIG. 3 illustrates a flowchart of another method for verifying physical proximity, according to an embodiment.

FIG. 3 illustrates a flowchart of a method 300 for verifying physical proximity of a user of the computing device 120 to the network device 102, for example, using the server 104, according to an embodiment. In at least one embodiment, the server 104 implementing the method 300 may interact with the computing device 120 implementing the method 200 discussed and described above, such that the methods 200, 300 may be part of an overall method for verifying physical proximity of a user of the computing device 120 to the network device 102.

The method 300 may begin by providing an initial set up or "registration" of the tag 116 and the network device 102. Accordingly, as mentioned above, a tag 116 with a unique (or at least reasonably unique) identifier may be fixed in, on, or proximal to the network device 102. The network device 102 may also have a unique identifier, such as a serial number. Accordingly, the server 104 may associate the network device 102 with the tag identifier, as at 302. In at least one example, the computing device 120 may be employed to provide such registration. Further, the server 104 may store the network device identifier of the network device 102 in a database of identifiers, and then associate the network device identifier of the network device 102 with the tag identifier in the database. In at least one embodiment, the network device 102 my submit its identifier (serial number) for example, through an extensibility application loaded on the network device 102. A variety of other schemes and identifying information, such as a network addresses, etc. may be employed to allow a particular network device 102 to be identified in a database of network devices 102, with serial number being just one among many. With the network device 102 registered, the network device 102 may be configured to prevent access to one or more services, e.g., locked down, unless and until an access authorization is granted by the server 104.

The method 300 may then proceed to "normal" use of the system 100, for example, by the server 104 receiving an authorization request from the computing device 120, as at 304. As described above, the computing device 120 may read the tag 116, thereby acquiring the tag identifier therefrom. The computing device 120 may then transmit data indicating the tag identifier to the server 104, e.g., via a wireless connection over the network 106, in the form of the authorization request, which the server 104 receives.

The server 104 may then determine if the tag identifier matches the tag identifier of the tag 116 fixed to the network device 102. In some cases, the authorization request may include both the identifier of the network device 102 and the tag identifier of the tag 116 fixed thereto. In other cases, the number of possible tag identifiers may be sufficiently large, that false matches of a tag identifier to the wrong network device 102 may be unlikely, and thus the identifier of the network device 102 may not be included in the authorization request. Additionally, in some embodiments, the access request may include an identifier of the computing device and/or a user associated therewith, such that a particular level of access can be determined, for example, to determine whether unlock or lock certain (e.g., administrative) functions depending on the level of access granted to a particular individual.

The method 300 may then proceed to the server 104 determining that the acquired tag identifier—received in the authorization request—matches the tag identifier of the tag 116 fixed to the network device 102, as at 306. Accordingly, the server 104 may search the database linking the network devices 102 to the tag identifiers and determine if the tag identifier matches a network device. In embodiments where both a tag identifier and an identifier of the network device 102 are provided, either may be used to search the database, and then determine if both identifiers match the stored information.

If the server 104 determines that the tag identifier is not a match, is not in the database, or is otherwise incorrect, authorization may be withheld and, for example, an error or access denied message may be transmitted to the computing device 120, the network device 102, or both. On the other hand, if the server 104 determines that the tag identifier is correct, the method 300 may proceed to associating the network device 102 with a new tag identifier, as at 308, which may proceed immediately after determining that the tag identifier sent with the authorization request was a match at 306. Such associating may be accomplished by updating the tag identifier associated with the network device 102 in the database of tag identifiers.

The new tag identifier may be generated by the server 104 or by the computing device 120; however, the method 300 may include the server 104 withholding authorization until after the new association is made at 308. In an embodiment where the computing device 120 determines the new tag identifier, the computing device 120 may rewrite the tag 116 and transmit the new tag identifier to the server 104.

The method 300 may then proceed to the server 104 transmitting an authorization, as at 310. The authorization may be transmitted to the network device 102, unlocking the network device 102 for use by the user of the computing device 120 e.g., by interaction with input devices coupled with the network device 102, via the computing device 120, and/or the like. The authorization may also be transmitted to the computing device 120, notifying the computing device 120 that access is granted. Further, in an embodiment where the server 104 determines the new tag identifier, the authorization sent to the computing device 120 may include the new tag identifier, which the computing device 120 may use to rewrite the tag 116. Receiving the authorization request and/or receiving the new tag identifier may cause the computing device 120 to rewrite the tag, so as to substitute the tag identifier with the new tag identifier. In some cases, the authorization may also include instructions for execution by the computing device 120, which, when executed, may cause the computing device 120 to conduct such rewriting; however, in others, one or more applications executing on the computing device 120 may provide such instructions.

Having rewritten the tag 116 with a new tag identifier and updated the database of tag identifiers, the method 300 may proceed back to waiting for the next authorization request. Accordingly, a given tag identifier may be limited to a single use, with a new identifier being required for each subsequent access to the network device 102.

Further, the network device 102, server 104, or both may monitor usage of the network device 102 and require new access authorization periodically, upon certain triggers, etc. For example, the network device 102 may experience a period of inactivity, resulting in a timeout; after such a timeout, the network device 102 may return to lockdown, requiring a new access authorization from the server 104. In another embodiment, after certain operations are completed, the network device 102 may return to a lockdown, for example, after a print job is complete. In still other embodiments, the network device 102, the server 104, or both may receive a lockout request from the computing device 120, e.g., when the user is done performing tasks using the network device 102. The network device 102 may respond by locking itself down, or the server 104 may respond by instructing the network device 102 to lockdown. A variety of other lockdown triggers may be implemented to suit various needs consistent with the present disclosure.

Accordingly, it will be seen that embodiments of the disclosure provide a reliable proximity verification system for a network device, such as a multi-function printer. The tag 116 may undergo frequent read/rewrite operations, such that a captured code is only useful, at best, until the next lockdown trigger or the change of the tag identifier. Further, if a tag is removed or stolen, the theft will be apparent as soon as another user attempts to access the network device 102 and is unable to do so.

Moreover, embodiments of the system 100 and methods 200, 300 may be used to implement a print job release, as mentioned above. In such cases, the computing device 120 may acquire the tag identifier and transmit it, along with credentials associated with the user of the computing device 120 to the server 104 for validation. Accordingly, the user may not need to type in a personal identification number, password, or other identifying information, as this may be provided by the computing device 120.

Figure 4:
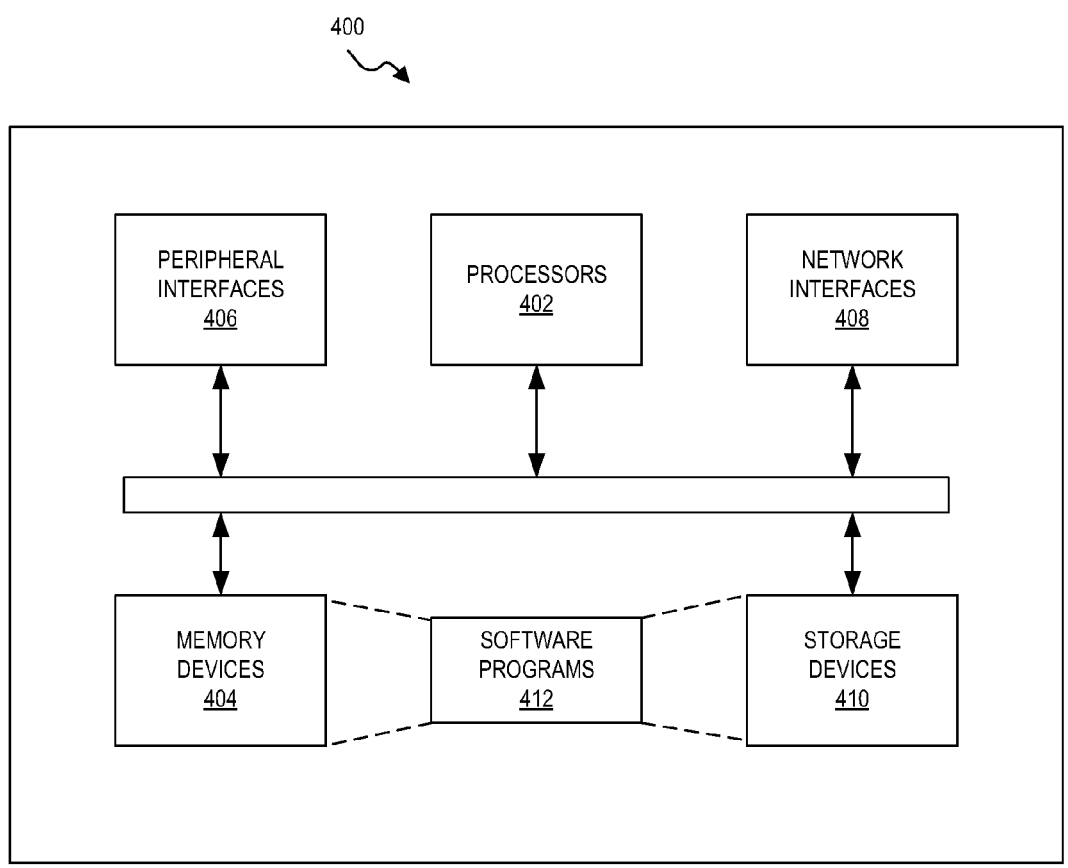
FIG. 4 illustrates a schematic view of a processor system, according to an embodiment.

Embodiments of the disclosure may also include one or more processor (i.e., computing) systems which may be implemented by the system 100, portions thereof, or partially implemented one or more processor systems. FIG. 4 illustrates a schematic view of such a processor system 400, according to an embodiment. The network device 102, server 104, and computing device 120 may each include one or more instances of the processor system 400; however, in some embodiments, the network device 102 and the server 104 may be provided by a single processor system 400 or by a group of processor systems 400.

The processor system 400 may include one or more processors 402 of varying core (including multiple core) configurations and clock frequencies. The one or more processors 402 may be operable to execute instructions, apply logic, etc. It will be appreciated that these functions may be provided by multiple processors or multiple cores on a single chip operating in parallel and/or communicably linked together. In one embodiment, the system 100 may include a single processor 402 configured to perform each function associated with the server 104 and network device 102; however, in other embodiments, these may be each be associated with one or more distinct processors 402. Similarly, the computing device 120 may be associated with one or more processors 402.

The processor system 400 may also include a memory system, which may be or include one or more memory devices and/or computer-readable media 404 of varying physical dimensions, accessibility, storage capacities, etc. such as flash drives, hard drives, disks, random access memory, etc., for storing data, such as images, files, and program instructions for execution by the processor 402. In an embodiment, the computer-readable media 404 may store instructions that, when executed by the processor 402, are configured to cause the processor system 400 to perform operations. For example, execution of such instructions may cause the processor system 400 to implement one or more portions and/or embodiments of the methods 200 and/or 300 described above.

The processor system 400 may also include one or more network interfaces 408, which may, in an embodiment, carry out the communication between the network device 102, computing device 120, and/or the server 104. The network interfaces 408 may include any hardware, applications, and/or other software. Accordingly, the network interfaces 408 may include Ethernet adapters, wireless transceivers, PCI interfaces, and/or serial network components, for communicating over wired or wireless media using protocols, such as Ethernet, wireless Ethernet, etc.

The processor system 400 may further include one or more peripheral interfaces 406, for communication with a display screen, projector, keyboards, mice, touchpads, sensors, other types of input and/or output peripherals, and/or the like. In some implementations, the components of processor system 400 need not be enclosed within a single enclosure or even located in close proximity to one another, but in other implementations, the components and/or others may be provided in a single enclosure.

The memory device 404 may be physically or logically arranged or configured to store data on one or more storage devices 410. The storage device 410 may include one or more file systems or databases in any suitable format. The storage device 410 may also include one or more software programs 412, which may contain interpretable or executable instructions for performing one or more of the disclosed processes. When requested by the processor 402, one or more of the software programs 412, or a portion thereof, may be loaded from the storage devices 410 to the memory devices 404 for execution by the processor 402.

Those skilled in the art will appreciate that the above-described componentry is merely one example of a hardware configuration, as the processor system 400 may include any type of hardware components, including any necessary accompanying firmware or software, for performing the disclosed implementations. The processor system 400 may also be implemented in part or in whole by electronic circuit components or processors, such as application-specific integrated circuits (ASICs) or field-programmable gate arrays (FPGAs).

The foregoing description of several possible embodiments has been presented for purposes of illustration only. It is not exhaustive and does not limit the present disclosure to the precise form disclosed. Those skilled in the art will appreciate from the foregoing description that modifications and variations are possible in light of the above teachings or may be acquired from practicing the disclosed embodiments.

For example, the same techniques described herein with reference to the processor system 400 may be used to execute programs according to instructions received from another program or from another computing system altogether. Similarly, commands may be received, executed, and their output returned entirely within the processing and/or memory of the processor system 400. Accordingly, neither a visual interface command terminal nor any terminal at all is strictly necessary for performing the described embodiments.

Likewise, the steps described need not be performed in the same sequence discussed or with the same degree of separation. Various steps may be omitted, repeated, combined, or divided, as necessary to achieve the same or similar objectives or enhancements. Accordingly, the present disclosure is not limited to the above-described embodiments, but instead is defined by the appended claims in light of their full scope of equivalents.

While the present teachings have been illustrated with respect to one or more implementations, alterations and/or modifications may be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the illustrated embodiment.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. A method for verifying physical proximity to a network device, comprising:
   establishing, using a computer device, electromagnetic communications with a tag that is fixed in, on, or proximal to the network device, wherein the tag is configured to be read and written to by the electromagnetic communications with the computing device, when the computing device is disposed in physical proximity to the tag;
   acquiring, from the tag via the electromagnetic communications, an encrypted tag identifier, wherein an unencrypted tag identifier contained within the encrypted tag identifier is not accessible to the computer device and wherein the unencrypted tag identifier uniquely identifies the network device;
   acquiring, from the tag via the electromagnetic communications, instructions for communicating with a server, wherein the server is configured to decrypt the encrypted tag identifier, to verify that the computer device is authorized to access the network device, and to authorize access to the network device based on the verification;
   establishing, by executing the instructions on the computer device, a communications session with the server;
   transmitting, to the server via the communications session, the encrypted tag identifier, wherein the server decrypts the encrypted tag identifier, verifies that the computer device is authorized to access the network device, and sends, based on the verification, authorization command to the network device allowing the computer device access to the network device;
   receiving, from the server via the communications session, an authorization confirmation that grants access to the network device, wherein the authorization confirmation includes a new encrypted tag identifier;
   rewriting, using the computing device, the tag so as to replace the encrypted tag identifier with a new encrypted tag identifier, wherein the sever utilizes the new encrypted tag identifier to grant future access to the network device; and
   performing one or more operations with the network device after receiving the authorization confirmation.

2. The method of claim 1, wherein acquiring the tag identifier comprises bringing the computing device to an area of physical proximity to the tag, wherein the tag is a radio frequency identification tag configured for near-field communication.

3. The method of claim 2, wherein the area of physical proximity is an effective range of communication of the tag, a size of the area is configurable, or both.

4. The method of claim 1, wherein the network device provides the server.

5. The method of claim 1, further comprising:
   selecting a portion of the encrypted new tag identifier using the computing device; and
   transmitting the portion of the encrypted new tag identifier to the server.

6. The method of claim 1, further comprising:
   acquiring a network device identifier using the computing device; and
   transmitting the network device identifier to the server.

7. The method of claim 1, wherein the computing device is a mobile device.

8. A method for verifying physical proximity to a network device, comprising:
   associating the network device with a tag identifier of a tag fixed to, in, or proximal to the network device,
   wherein the tag is readable and writable using electromagnetic communications with a computing device in physical proximity to the tag
   wherein the tag identifier uniquely identifies the network device, and
   wherein the tag stores the tag identifier as an encrypted tag identifier and stores instructions for communicating with a server;
   receiving, from the computer device using the instructions, a request to establish a communications session;
   receiving, at the server via the communications session, an authorization request from the computing device, the authorization request comprising the encrypted tag identifier;
   decrypting the encrypted tag identifier to obtain the tag identifier;
   determining that the tag identifier matches a stored tag identifier associated with the network device and the computer device is authorized to access the network device;
   in response to determining that the tag identifier matches the stored tag identifier, sending, to the network device, an authorization command granting the computer device access to the network device; and
   in response to determining that the tag identifier matches the stored tag identifier, causing the computing device to rewrite the tag so as to substitute the encrypted tag identifier with a new encrypted tag identifier, wherein the new encrypted tag identifier is utilized to grant future access to the network device.

9. The method of claim 8, further comprising associating the network device with the new encrypted tag identifier after determining that the tag identifier matches the stored tag identifier of the network device.

10. The method of claim 9, wherein associating the network device with the new encrypted tag identifier occurs before transmitting an authorization confirmation to the computer device.

11. The method of claim 8, further comprising receiving the new encrypted tag identifier from the computing device after transmitting an authorization confirmation, wherein causing the computing device to rewrite the tag comprises transmitting the authorization confirmation to the computing device.

12. The method of claim 8, further comprising selecting the new encrypted tag identifier, wherein causing the computing device to rewrite the tag comprises transmitting the new encrypted tag identifier to the computing device.

13. The method of claim 12, further comprising transmitting instructions to the computing device that, when executed, are configured to cause the computing device to rewrite the tag with the new encrypted tag identifier.

14. The method of claim 8, wherein the tag comprises a near-field communication tag.

15. The method of claim 8, further comprising associating the network device with a network device identifier, wherein:
   receiving the authorization request further comprises receiving an acquired network device identifier; and
   determining that the tag identifier matches the stored tag identifier of the network device further comprises determining that the acquired network device identifier matches the network device identifier that is associated with the network device.

16. A system, comprising:

a network device;

a tag that is readable and writeable by electromagnetic communications with a computing device positioned in physical proximity to the tag, the tag being fixed in a location in, on, or proximal to the network device and being configured to store an encrypted tag identifier comprising a tag identifier and store instructions for communicating with a server; and the server coupled to the network device, wherein the server comprises one or more processors and one or more computer-readable storing instructions that, when executed by at least one of the one or more processors, are configured to cause the server to perform operations, the operations comprising:

associating the network device with the tag identifier;

receiving, from the computer device using the instructions, a request to establish a communications session receiving, via the communications session, an authorization request from the computing device, the authorization request comprising the encrypted tag identifier;

decrypting the encrypted tag identifier to obtain the tag identifier;

determining that the tag identifier matches a stored tag identifier of the network device and the computer device is authorized to access the network device;

in response to determining that the tag identifier matches the stored tag identifier, sending, to the network device, an authorization command granting the computer device access to the network device; and in response to determining that the acquired tag identifier matches the stored tag identifier, causing the computing device to rewrite the tag so as to substitute the encrypted tag identifier with a new encrypted tag identifier, wherein the new encrypted tag identifier is utilized to grant future access to the network device.

17. The system of claim 16, wherein the computing device comprises a mobile device and the tag comprises a near-field communication tag.

18. The system of claim 16, wherein the network device comprises a printing device.

19. The system of claim 16, wherein the operations further comprise transmitting the new encrypted tag identifier to the computing device.

* * * * *